(12) United States Patent
Scheel et al.

(10) Patent No.: US 6,910,090 B1
(45) Date of Patent: Jun. 21, 2005

(54) MAINTAINING COMMUNICATIONS IN A BUS BRIDGE INTERCONNECT

(75) Inventors: Richard Scheel, Pleasanton, CA (US); David V. James, Palo Alto, CA (US); Hisato Shima, Toyko (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 627 days.

(21) Appl. No.: 09/665,715

(22) Filed: Sep. 20, 2000

Related U.S. Application Data

(60) Provisional application No. 60/155,305, filed on Sep. 21, 1999.

(51) Int. Cl.[7] ............................................. G06F 13/36
(52) U.S. Cl. ...................................... 710/306; 710/105
(58) Field of Search ............................. 710/126, 104, 710/305, 105, 306, 310, 314

(56) References Cited

U.S. PATENT DOCUMENTS

| | | |
|---|---|---|
| 5,394,556 A | 2/1995 | Oprescu |
| 5,511,165 A | 4/1996 | Brady et al. |
| 5,579,486 A | 11/1996 | Oprescu et al. |
| 5,630,173 A | 5/1997 | Oprescu |
| 5,732,280 A | 3/1998 | Bealkowski et al. |
| 5,774,683 A | 6/1998 | Gulick |
| 5,825,752 A | 10/1998 | Fujimori et al. |
| 5,828,899 A | 10/1998 | Richard et al. |
| 5,875,301 A | 2/1999 | Duckwall et al. |
| 6,038,625 A | 3/2000 | Ogino et al. |
| 6,131,119 A | 10/2000 | Fukui |
| 6,157,972 A | 12/2000 | Newman et al. |
| 6,160,796 A | 12/2000 | Zou |
| 6,219,697 B1 | 4/2001 | Lawande et al. |
| 6,359,901 B1 | 3/2002 | Todd et al. |
| 6,378,000 B1 | 4/2002 | Akatsu et al. |
| 6,389,496 B1 | 5/2002 | Matsuda |
| 6,394,905 B1 | 5/2002 | Takeda et al. |
| 6,408,355 B1 * | 6/2002 | Toguchi ...................... 710/314 |
| 6,434,117 B1 | 8/2002 | Momona |
| 6,434,649 B1 * | 8/2002 | Baker et al. ................ 710/107 |
| 6,463,550 B1 | 10/2002 | Cepulis et al. |
| 6,496,945 B2 | 12/2002 | Cepulis et al. |
| 6,522,654 B1 | 2/2003 | Small |
| 6,584,539 B1 * | 6/2003 | James et al. ................ 710/314 |
| 2003/0172201 A1 * | 9/2003 | Hatae et al. ................... 710/8 |

* cited by examiner

*Primary Examiner*—Tim Vo
*Assistant Examiner*—Kim T. Huynh
(74) *Attorney, Agent, or Firm*—Blakely, Sokoloff, Taylor & Zafman LLP

(57) ABSTRACT

A method of maintaining communications in a bus bridge interconnect including a plurality of buses linked by at least one bus bridge. The method includes receiving a change indication signal from a talker node, performing an address resolution protocol in response to the change indication signal to find an updated node identification address ("nodeID") for a listener node using a extended unique identifier ("EUI") of the listener node, and storing the updated listener nodeID with the listener node EUI.

20 Claims, 10 Drawing Sheets

MAINTAINING COMMUNICATIONS IN A BUS BRIDGE INTERCONNECT

This application claims benefit of U.S. Provisional Application No. 60/155,305 filed Sep. 21, 1999.

FIELD OF THE INVENTION

The present invention relates generally to audio, video, audio/video interconnected systems for home and office use. More particularly, the present invention relates to communication management in such systems.

BACKGROUND OF THE INVENTION

With the development of consumer electronic audio/video (A/V) equipment, and the advance of digital A/V applications, such as consumer A/V device control and signal routing and home networking, various types of data in various formats can now be transferred among several audio/video control (AV/C) devices via one digital bus system. However, many current systems do not have sufficient bandwidth resources to transfer and display all the different types of data at the same time.

Typical computer systems solve the bandwidth problem by increasing the bandwidth of the system bus to handle all of these forms, types and amount of data. As a result, as users request more types of information such as in multimedia applications, the system bus has become more clogged with information other than information directly utilized and needed by the main processor.

Many computer systems incorporate at least two buses. A first bus, commonly referred to as a memory bus, is typically used for communications between a central processor and a main memory. A second bus, known as a peripheral bus, is used for communications between peripheral devices such as graphics systems, disk drives, or local area networks. To allow data transfers between these two buses, a bus bridge is utilized to "bridge" and thereby couple, the two buses together.

One example of a high-speed bus system for interconnecting A/V nodes, configured as a digital interface used to transport commands and data among interconnecting audio/video control (AV/C) devices, is the IEEE 1394 standard serial bus implemented by IEEE Std 1394–1995, *Standard For A High Performance Serial Bus*, Aug. 30, 1996 (hereinafter "IEEE 1394 standard") and related other 1394 standards.

The IEEE 1394 standard is an international standard for implementing a high-speed serial bus architecture, which supports both asynchronous and isochronous format data transfers. The IEEE 1394 standard defines a bus as a non-cyclic interconnect, consisting of bus bridges and nodes. Within a non-cyclic interconnect, devices may not be connected together so as to create loops. Within the non-cyclic interconnect, each node contains an AV/C device, and bus bridges serve to connect buses of similar or different types.

The primary task of a bridge is to allow data to be transferred on each bus independently without demonstrating performance of the bus, except when traffic crosses the bus bridge to reach the desired destination on the other bus. To perform this function, the bridge is configured to understand and participate in the bus protocol of each of the buses.

Multi-bus systems are known to handle the large amounts of information being utilized. However, communication between buses and devices on different buses is difficult.

Typically, a bus bridge may be used to interface I/O buses to the system's high-performance processor/memory bus. With such I/O bridges, the CPU may use a 4-byte read and write transaction to initiate DMA transfers. When activated, the DMA of a serial bus node generates split-response read and write transactions which are forwarded to the intermediate system backbone bus which also implements serial bus services.

Depending on the host system design, the host-adapter bridge may have additional features mandated by differences in bus protocols. For example, the host bus may not directly support isochronous data transfers. Also, the host-adapter bridge may enforce security by checking and translating bridge-bound transaction addresses and may often convert uncached I/O transactions into cache-coherent host-bus transaction sequences.

Each time a new device or node is connected or disconnected from an IEEE 1394 Standard Serial Bus, the entire bus is reset and its topology is reconfigured. The IEEE 1394 Standard Device Configuration occurs locally on the bus without the intervention of a host processor. In the reset process, three primary procedures are typically performed; bus initialization, tree identification, and self-identification. Within the IEEE 1394 Standard, a single node must first be established as the root node during the tree identification process in order for the reconfiguration to occur.

A conventional isochronous bus connection includes multiple buses, one or more bus bridges, a talker node, and one or more listener nodes. A talker node usually provides an isochronous data stream and forwards the isochronous data stream onto a bus. A listener node typically reads the packets from the isochronous data stream.

A typical method for establishing communication between the talker node and the listener node is to build isochronous bus connections from the talker node toward the listener node.

A problem with the maintenance communication between the talker node and the listener node is that when busIDs have changed, nodes need to be notified of this occurrence. Another problem associated with the maintenance isochronous stream is notifying listeners when isochronous bandwidth requirements have changed. One approach to notifying nodes of bandwidth changes in the talker is to initiate a broadcast event that would inform other nodes of the bandwidth-requirement change. However, this approach is complicated and unnecessarily signals uninvolved controllers.

SUMMARY OF THE INVENTION

A method of maintaining communications in a bus bridge interconnect including a plurality of buses linked by at least one bus bridge is described. The method includes receiving a change indication signal from a talker node, performing an address resolution protocol in response to the change indication signal to find an updated node identification address ("nodeID") for a listener node using a extended unique identifier ("EUI") of the listener node, and storing the updated listener nodeID with the listener node EUI.

BRIEF DESCRIPTION OF THE DRAWINGS

Features and advantages of the prevention invention will be apparent to one skilled in the art in light of the following detailed description in which.

DETAILED DESCRIPTION

A method and system for maintaining a listener's link to a controller in a bus bridge system.

For purposes of explanation, in the following description, numerous specific details are set forth in order to provide a thorough understanding of the present invention. It will be apparent, however, to one skilled in the art that the present invention can be practiced without these details. In other instances, well-known structures and devices are showing block diagram form in order to avoid obscuring the present invention.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signal (e.g., carrier waves, infrared signals, digital signals, etc.); etc.

A communication mechanism, which may be used in an IEEE 1394 environment, provides communication connection maintenance for isochronous connection. An isochronous bus connection may include a talker and multiple listeners. The term talker and talker node will be used interchangeably herein. Likewise the term listener and listener node will be used interchangeably herein.

In one embodiment, the mechanism allows the listener to verify the source of a message received from a controller where the controller nodeID has changed by identifying a node according to an extended unique identifier ("EUI") of the controller.

In one embodiment, the mechanism allows the controller to update a nodeID of a listener by identifying an EUI of the listener. In one embodiment, the controller receives a net change indication for a listener and the controller performs an address resolution protocol ("ARP") to determine the nodeID of the listener.

In one embodiment, the mechanism allows the listener to communicate property changes by a talker to a controller.

Figure 1:
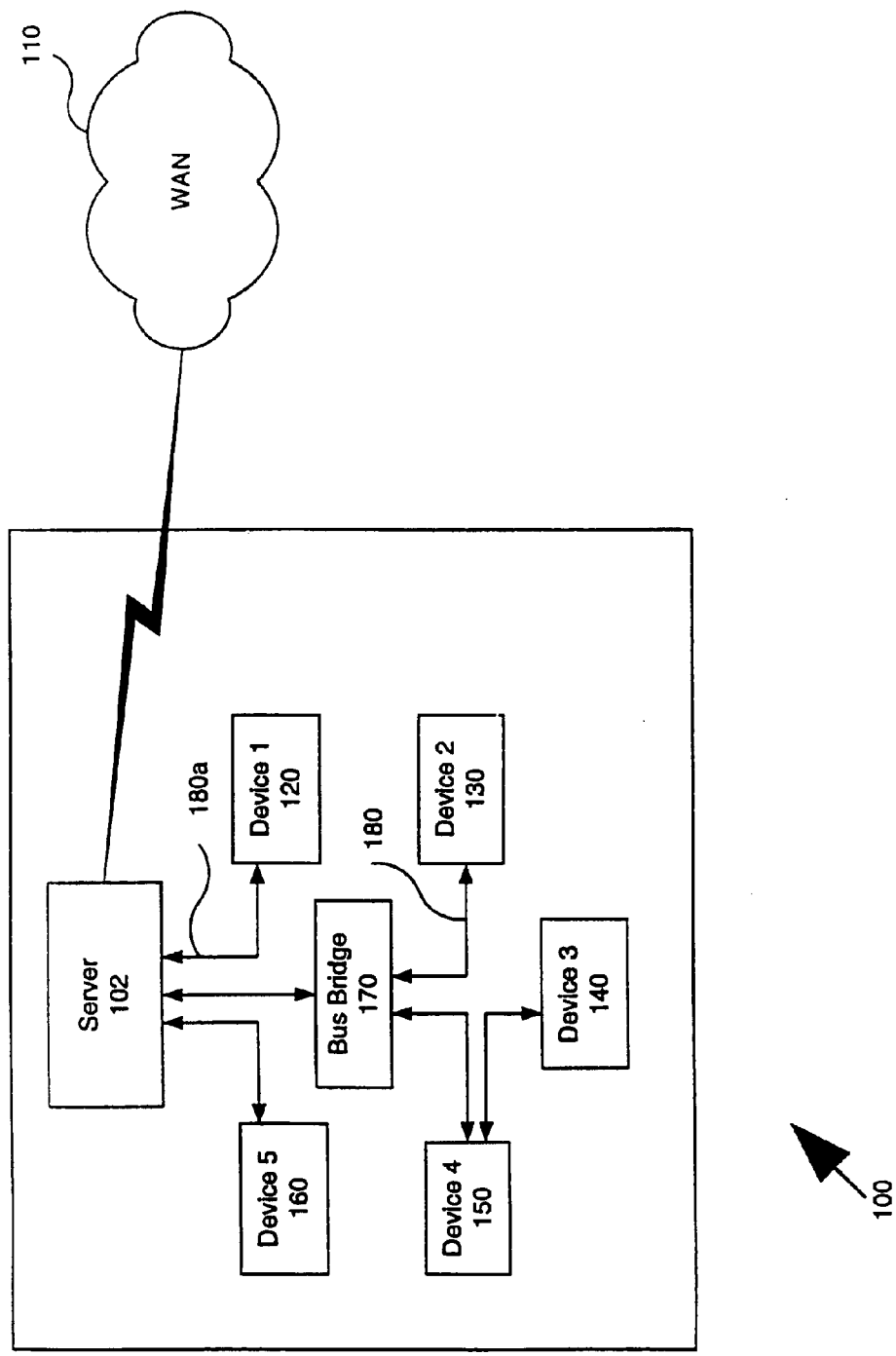
FIG. 1 is a block diagram of one embodiment for an interconnect topology.

FIG. 1 is a block diagram of one embodiment for an interconnect topology 100. Referring to FIG. 1, server 102 is connected to a wide area network (WAN) 110 and to a bus bridge 170. The bus bridge is interconnected to a number of audio, video, and/or audio/video devices, 120, 130, 140, 150, and 160. In one embodiment, the devices (120–160) are connected to bus bridge 170 via the IEEE 1394 standard serial bus. Server 102 may be any device that is capable of connection to both a bus bridge 170 and wide area network 110, such as, for example, a personal computer or a set-top box. In one embodiment, network 110 may be a wide area network, such as, for example, the Internet, or a proprietary network such as America Online®, Compuserve®, Microsoft Network®, or Prodigy®. In addition, WAN 110 may be a television communications network. Server 102 includes a network interface which communicates with WAN 110.

Topology 100 includes high speed serial bus 180a and 180. In one embodiment, serial bus 180 is the IEEE 1394 standard serial bus. Topology 100 includes various consumer electronic devices 120–160 connected via the high speed serial bus 180 to bus bridge 170. The consumer electronic devices 120–160 may include, for example, a printer, additional monitor, a video camcorder, an electronic still camera, a video cassette recorder, digital speakers, a personal computer, an audio actuator, a video actuator, or any other consumer electronic device that includes a serial interface which complies with a serial interface standard for networking consumer electronic devices—for example, the IEEE 1394 standard. Topology 100 may be contained within a home or office. Bus bridge 170 is used to connect devices 120–160 in which devices 120–160 may be physically located within different rooms of the home or office. Although the original IEEE bus standard is designed for use with a cable interconnect, any communication media may be used such as radio frequency (RF) communication or the like.

Figure 2:
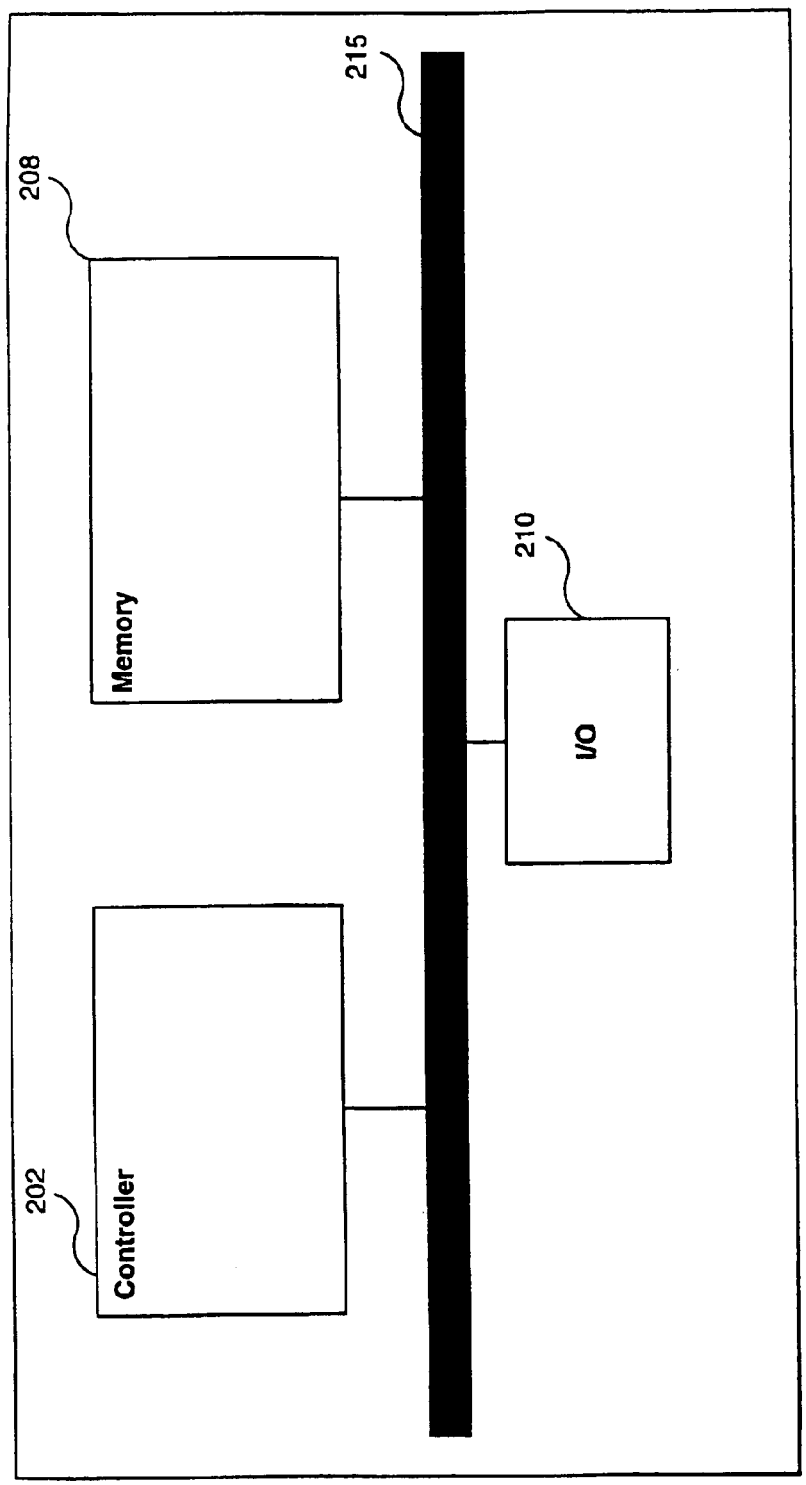
FIG. 2 is a block diagram of a device of FIG. 1.
Figure 2:

FIG. 2 is a block diagram of a device 120. Referring to FIG. 2, device 120 may be a laser printer, digital camera, set-top box, or any other appropriate consumer electronic device capable of being connected via a high speed serial bus 180. In one embodiment, the device 120 includes a controller 202, memory 208, and I/O 210, all connected via bus 215. Memory 208 may include, for example, read only memory (ROM), random access memory (RAM), and/or non-volatile memory. I/O 210 provides connection with wide area network 110, bus bridge 170, and another peripheral device (130–160).

In one embodiment, I/O 210 is a serial bus interface that complies with a serial interface standard for networking with consumer electronic devices (120–161) and bus bridge 170 within topology 100. For example, the serial bus interface and topology 100 may use the IEEE 1394 standard serial bus. I/O 210 provides for receiving signals from and transmitting signals to other consumer electronic devices (130–160) or bus bridge 170.

Memory 208 provides temporary storage for voice and data signal transfers between outside network 110 and topology 100. In addition, memory 208 may buffer digital voice and data signals received by I/O 210 from WAN 110 before signals are transmitted onto IEEE 1394 standard bus 180.

Controller 202 controls various operations of device 120. Controller 202 monitors and controls the traffic through the device 120 to and from topology 100 and WAN 110.

Device 120 I/O 210 may have one or more physical ports. A single port device discontinues the bus along the given branch of the bus, whereas devices with two or more ports allow continuation of the bus. Devices with multiple ports permit a daisy chained bus topology, even though the signaling environment is point-to-point. That is, when a multi-port node receives a packet of data, the data is detached and retransmitted to the necessary port as indicated within the data. The configuration is performed dynamically as new devices are attached and/or removed from bus 180.

The 1394 standard bus protocol is designed to support peer-to-peer transfers between devices. This allows serial bus devices to transfer data between themselves without intervention from a computer system or host system. This allows high throughput between devices without affecting the performance of the computer system. Thus, a video camera may be set up to transfer between itself and a video cassette recorder without accessing a computer system.

Figure 3:
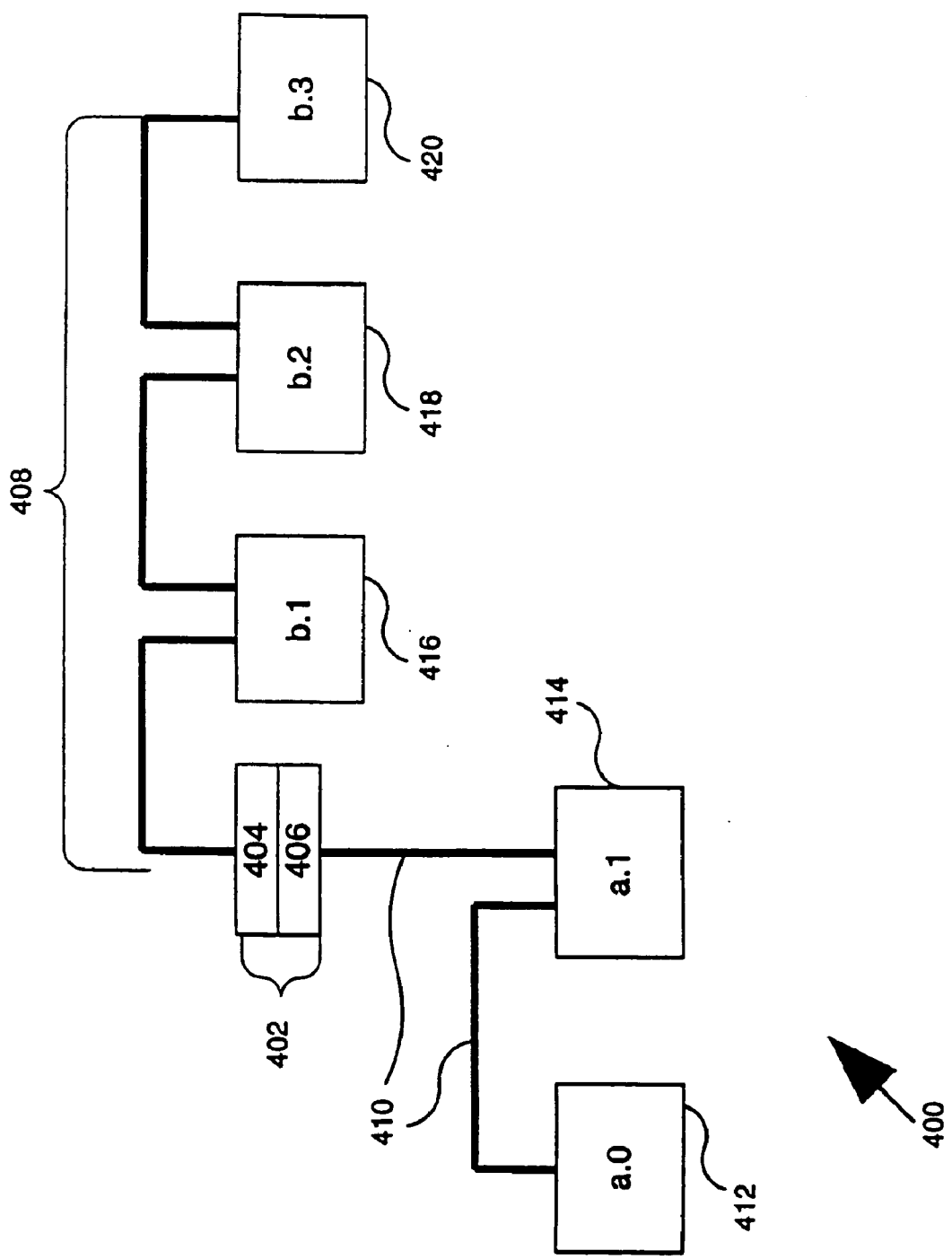
FIG. 3 is a block diagram of one embodiment for a 1394 standard bus bridge system.

FIG. 3 is a block diagram of one embodiment for a 1394 standard bridge bus system 400. Referring to FIG. 3, system 400 includes bridge 402 which connects two or more buses 408 and 410. Bus 408 and 410 may be the same or different types of buses. For example, bus 408 may be a 1394 standard serial bus and bus 410 may be a different high performance bus. The 1394 standard bus architecture limits the number of nodes or devices 310 on a bus 263 and supports multiple bus systems via bus bridge 402.

The control and status register (CSR) architecture, ISO/IEC 13213 (ANSI/IEEE 1212), *Information systems-Control and Status Registers (CSR) Architecture Microcomputer Buses*, defines the 1394 standard bus addressing structure, which allows approximately $2^{16}$ nodes (404, 406, 412–420). The CSR standard defines their registry, their functionality, and, where appropriate, where they appear in the address space.

Figure 4:
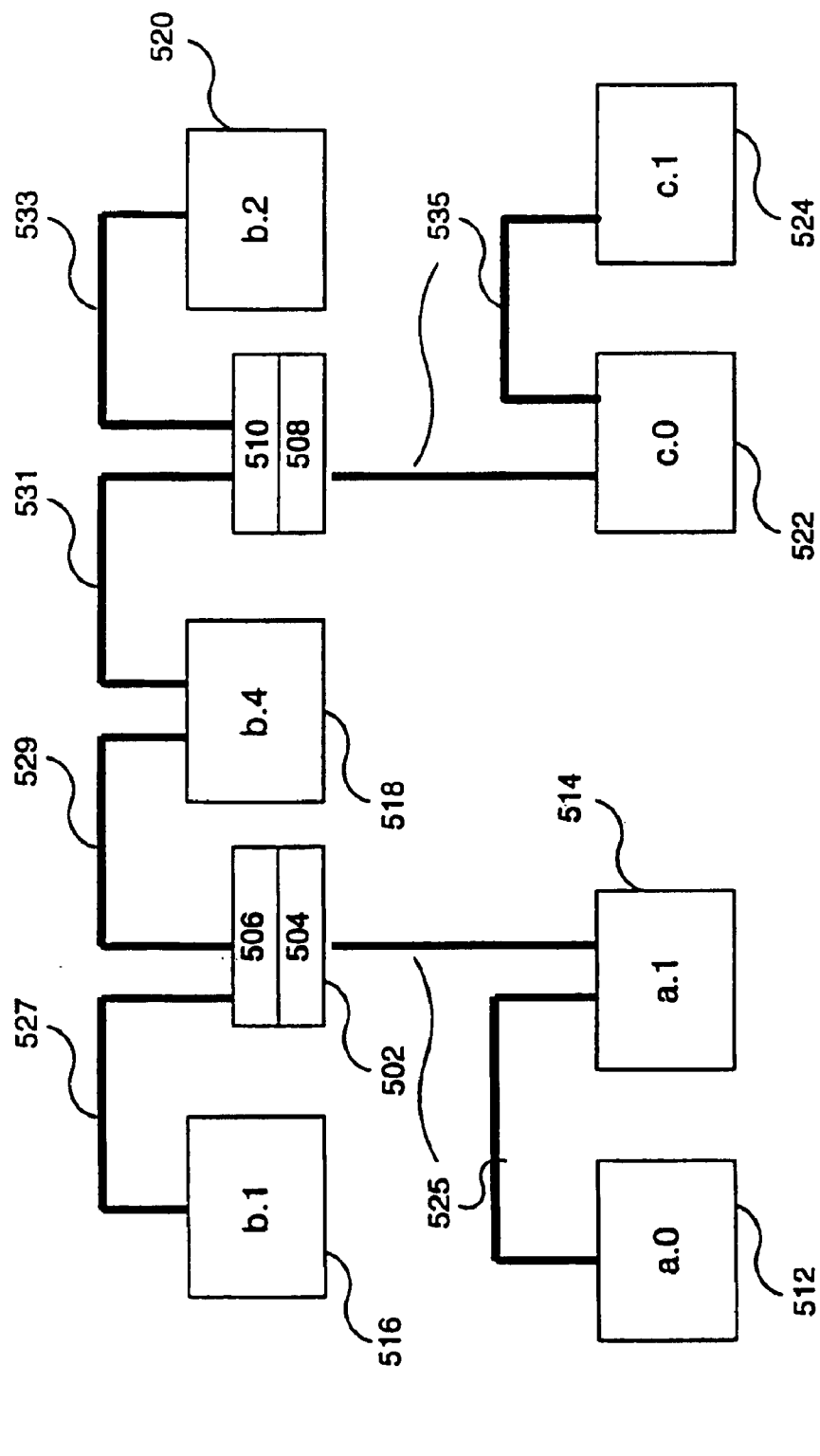
FIG. 4 is a block diagram of one embodiment for a 1394 bus bridge topology.
Figure 5:
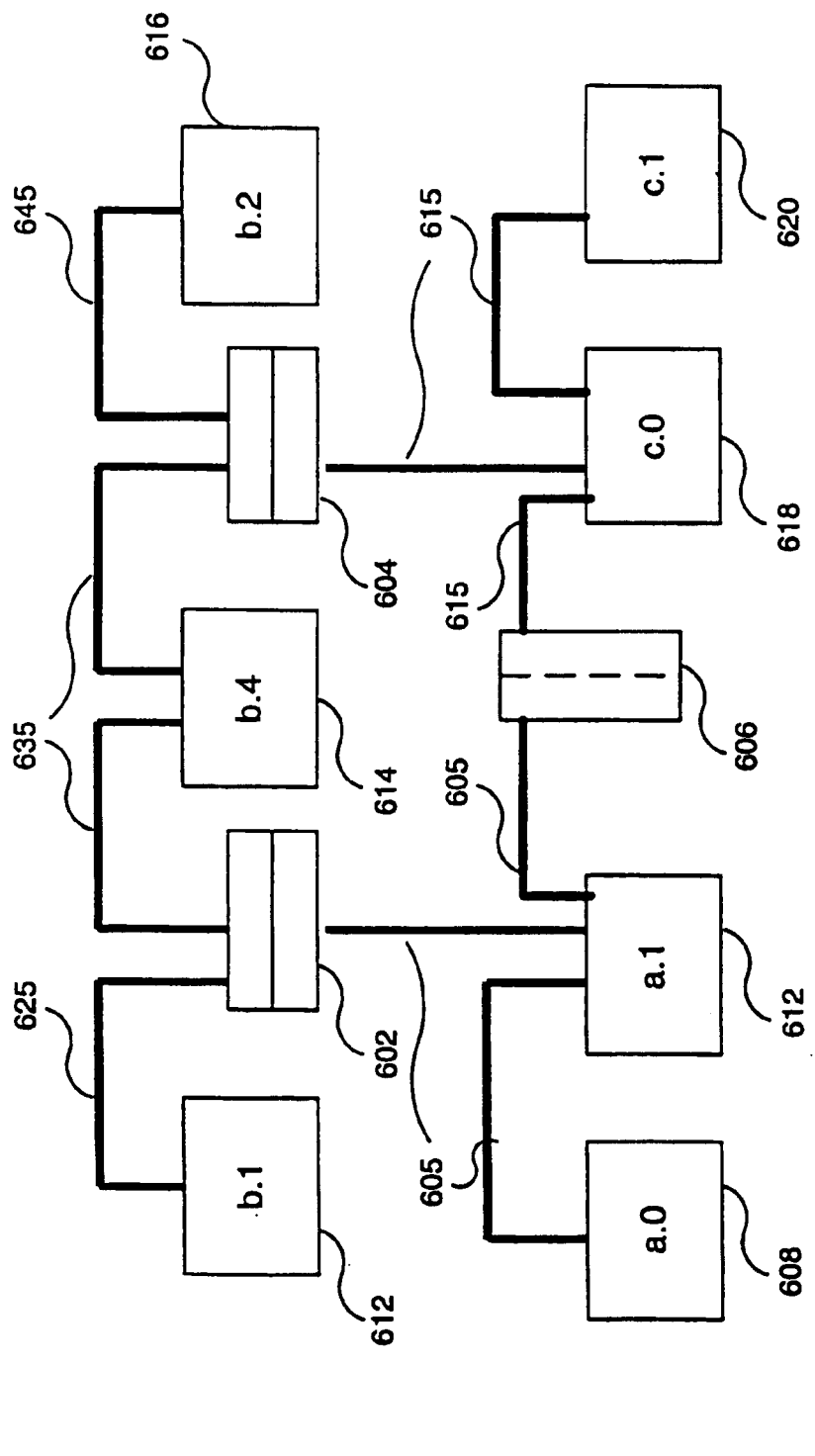
FIG. 5 is a block diagram of one embodiment for a looped bus bridge topology.

FIG. 3 is the simplest instance of a bus topology in which the net has one bus bridge. FIG. 4 illustrates a net that may have more than one bus bridge and, when so structured, is hierarchical in nature. FIG. 5 illustrates a network whose physical topology may have loops, but whose loops are electronically disabled to generate a hierarchical structure. In the description that follows, a collection of multiple buses connected through a bus bridge is referred to as a "net".

FIG. 4 is a block diagram of one embodiment for a 1394 bridge bus topology 500. Referring to FIG. 4, topology 500 has one prime portal 504 and one or more alpha portals 506 and 508. The primary bus 525 has exactly one prime portal 504 and the secondary buses 527, 529, 531, 533, and 535 have exactly one alpha portal each—506, 508 and 510. Each bus 525–535 may have any number of secondary portals. An alpha portal is on the path to a prime portal. Any portal not a prime portal or an alpha portal is a secondary portal. The prime portal or the alpha portal may be referred to as a primary portal.

Within an interconnect topology 500, the bridge portal with the largest portal ID identifier is elected to become the prime portal 504. In an alternate embodiment, the bridge portal with the smallest portal ID identifier is elected to become the prime portal 504. Each portal appears as a node on its attached bus. The bus with the prime portal 504 is termed the primary bus 525 and other buses 527–535 are termed secondary buses. On secondary buses 527–535, the bridge portal that leads to the primary bus 525 is called the alpha portal (506, 508). After a bridge bus interconnect is configured, any node within the interconnect may be accessed by its unique 16-bit node identification address. The node identification address contains the bus ID and the local ID components. Referring to FIG. 4, the bus identification IDs of nodes 512–524 are indicated by the letters a, b, and c and the local ID is indicated by the numbers 0–4.

In one embodiment, alpha portal 504 is responsible for rejecting missed address asynchronous data packets by accepting these requests and returning error reporting responses. The previous and current prime and alpha portal identifiers are used to classify nodes when an interconnect topology changes, and the alpha portal is the isochronous clock reference for other nodes on the bus.

Bus bridge topology 500 may change and be established dynamically during operation of bus bridge system 500. In one embodiment, the bus bridge topology 500 is established during net refresh. Within topology 500, portals selectively route packets. Asynchronous routing tables are stable until topology 500 changes during a net refresh or net reset operation. Asynchronous routing tables are dynamic and are changed by their asynchronous connect and disconnect operations of the protocols.

FIG. 5 is a block diagram of one embodiment for a looped bus bridge topology 600. Referring to FIG. 5, during node 300 addition, portal 606 may be added to the topology 600 forming a loop. Thus, a path exists from a0–b4 through c0 back to a0. During initialization, the redundant portal 606 is disabled so that a hierarchical bus bridge topology remains.

In an alternate embodiment, cyclical net topologies may be allowed. In this alternate embodiment, software routines may partially activate the redundant bridge 606 and allow a shortest path routing between nodes. For example, traffic between bus a 605 and bus c 615 may be efficiently routed without introducing deadlocks.

Figure 6:
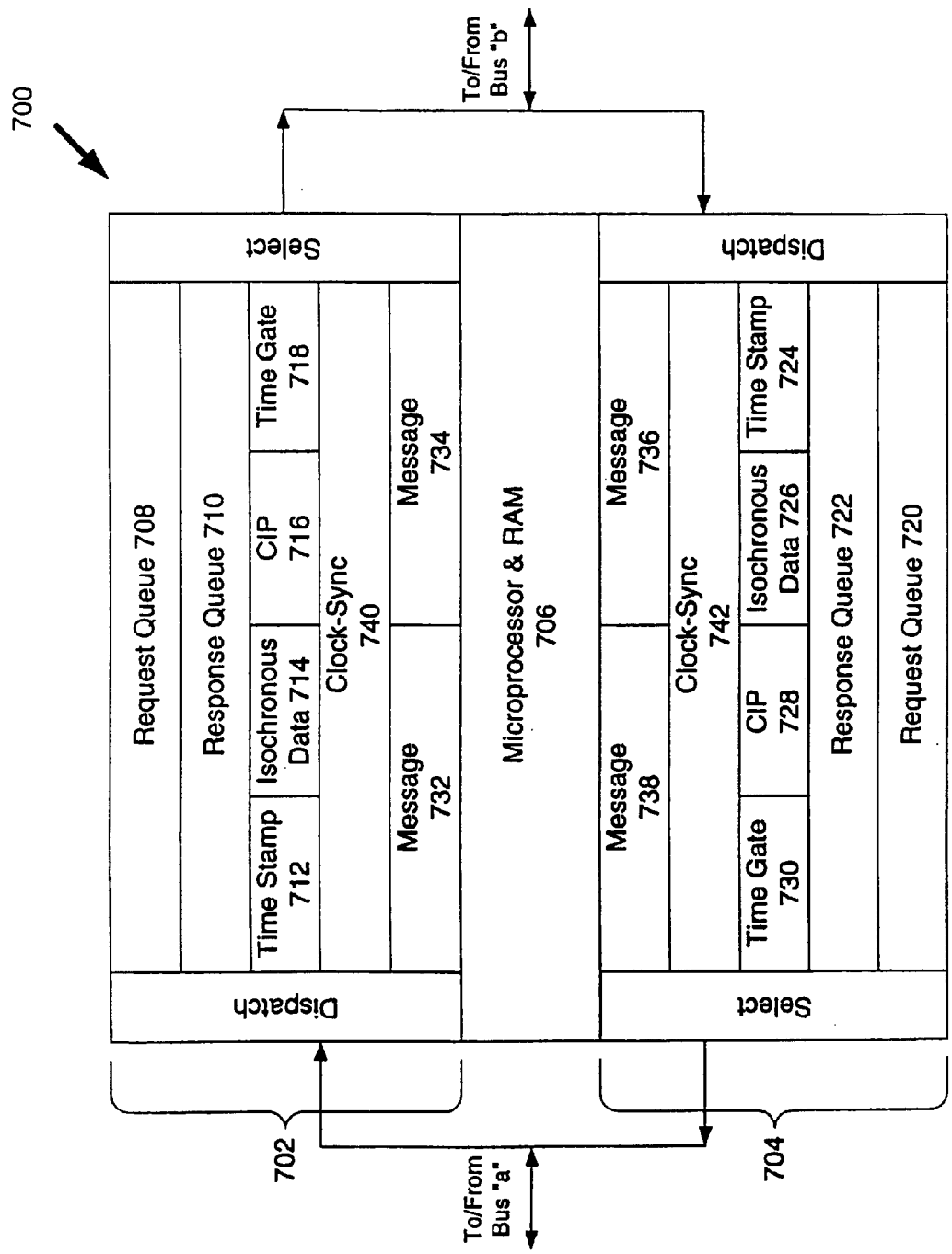
FIG. 6 is a block diagram of one embodiment for bus bridge components.

FIG. 6 is a block diagram of one embodiment for bus bridge components 700. Referring to FIG. 6, bus bridge components 700 are maintained within each portal in which bus "a" to bus "b" components 702 and bus "b" to bus "a" components 704 are independently maintained. Components 700 also contains shared microprocessor and RAM 706.

Asynchronous and isochronous packet transfers may not acquire a bus at the same time. Therefore, asynchronous packets are placed in request queues 708, 720 and response queues 710, 722. The asynchronous packets are selected for transfer at times when isochronous packets are not being transferred. Isochronous packets are received and time stamped 712, 724. Time gates 718, 730 release the isochronous packets 714, 726, together with common isochronous packet (CIP) headers 716, 728, at fixed times. Routing tables select which asynchronous and isochronous packets are accepted and queued for adjacent bus delivery.

Topologies may share physical buffer space rather than implementing physical distinct stacks subject to the following: bus "a" to bus "b" and bus "b" to bus "a" queues operate independently, response processing is never blocked by queued requests, and asynchronous subactions and isochronous packets are forwarded independently. Topologies may block a request behind the previously queued response without generating potential deadlocks; however, requests and responses are processed independently.

Isochronous routing decisions are made by checking the isochronous packet's channel number. Accepted packets are converted and retransmitted on the adjacent bus with newly assigned channel numbers, speeds, and CIP-header and, when a CIP-header is provided, time-stamp parameters 716, 728 from the CIP-header. CIP-headers may be pre-appended to some isochronous packets to further describe their format and function and desired presentation time. When the packets incur delays while traversing through a bridge, then presentation time must be adjusted to compensate for this delay. CIP headers are defined in ISO/IEC 61883 specification. Isochronous packets received in cycle n are forwarded to the adjacent bus in cycle n+k where k is an implementation dependent constant. Messages may be passed around one bus or pass through a bridge by writing to a standardized message location 732, 734, 736, 738 on a bridge's portal. This allows bus-interconnect topologies to be restored while freezing, or discarding when necessary, previously queued subactions.

Distribution of clock-sync information 740, 742 from the primary-bus source is performed by placing calibration information in isochronous-clock pseudo queues before forwarding this information to the dock master on the adjacent portal. In one embodiment, clock-sync information flows from the primary bus downward, so that only one clock-sync pseudo queue may be required.

In support of bus bridges, each node has two nodeID addresses: physical ID address and virtual ID address. A physical nodeID has a $3FF_{16}$ valued bus ID; a virtual nodeID has smaller bus ID addresses. In the absence of bus bridges, all nodes are accessed through their physical addresses. In the presence of bus bridges, the physical address is used to configure the node and the virtual address is normally used thereafter.

Directed-asynchronous routing decisions are made by checking the destination ID addresses of pass-through packets. Accepted packets are directly routed to the bridge's opposing port. In addition, an asynchronous quarantine is maintained which selectively enables forwarding of a request sub-action based on the local identification of a bus-local requester. A set of legacy bits identifies local nodes which requires specific processing of sourced requests and returning responses.

Figure 7:
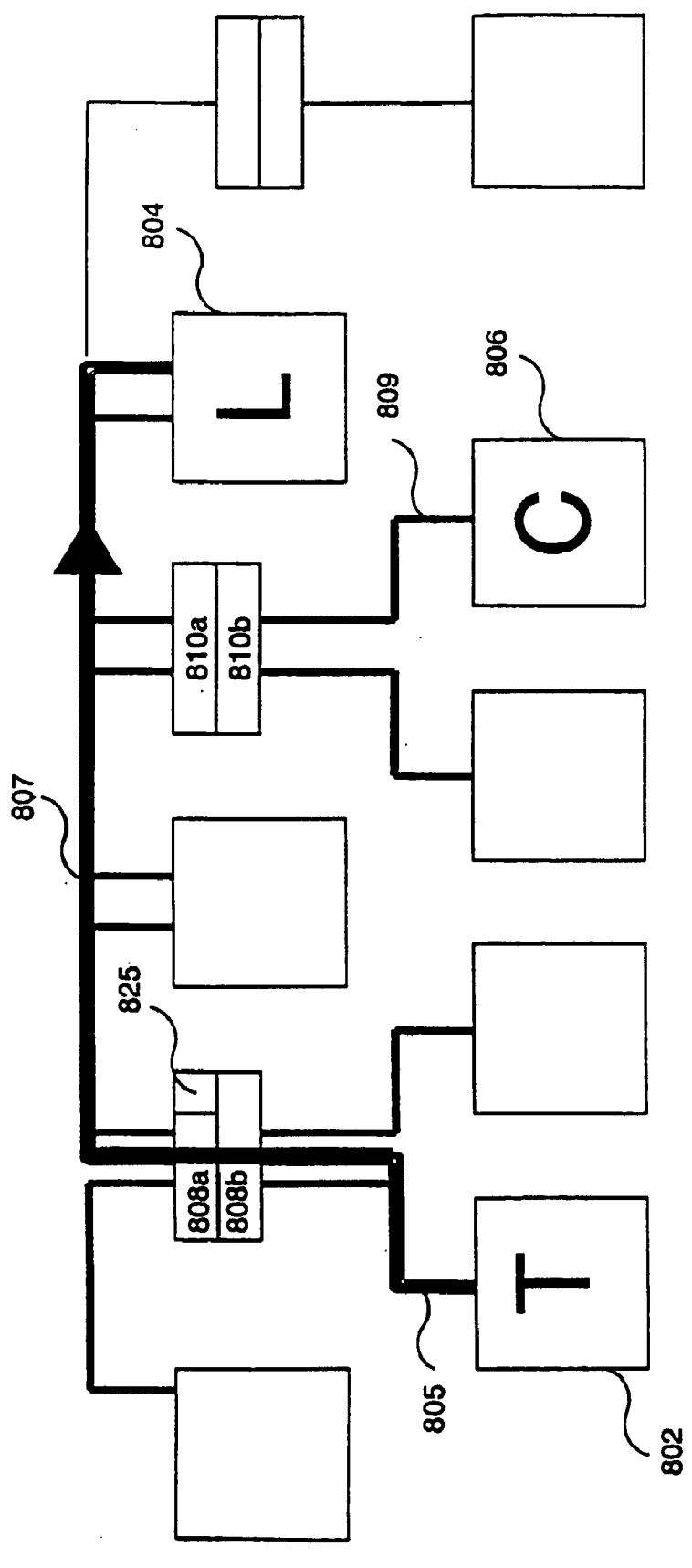
FIG. 7 is a block diagram of one embodiment for bus bridge isochronous transfer.

FIG. 7 is a block diagram of one embodiment for bus bridge isochronous transfer. Referring to FIG. 7, isochronous connections involve one talker 802 and one or more multiple listener 804/controller 806 pairs. Isochronous packets are accepted based on the current channel identification and are retransmitted on the adjacent bus with a new channel ID. A controller 806 establishes an isochronous connection. The isochronous connection enables communication between talker 802 and listener 804. An isochronous connection may be made between a single talker 802 and multiple listeners 804.

Isochronous non-overlaid connections proceed as follows: controller 806 sends a message to the final portal 810*a* in the path towards listener 804. If necessary, portal 810*a* forwards the message to the first portal on the path between the listener 804 and talker 802 (in this case, portal 808*a*). Portal 808*a* acquires isochronous resources from IRM 825 on its bus. IRM 825 may be located within portal 808*a* or any other node. The message is forwarded towards the talker bus 805, which results in the message being received by portal 808*b*. Portal 808*b* acquires the isochronous resources in IRM 825 and updates the oPCR within talker 802. The message is forwarded back toward listener 804, which results in it being received by portal 808*a*. Portal 808*a* updates the iPCR on listener 804 so that it listens to the correct channel. Portal 808*a* forwards a message-complete indicator to controller 806.

In one embodiment, a disconnect message is sent from controller to portal 810*b*. Portal 810*b* forwards the message to portal 808*a* which updates the iPCR on listener 804 and releases the IRM resources associated with bus 807. The message is forwarded to portal 808*b*. The oPCR of talker 802 is updated in order to stop transmission. Portal 808*b* updates the IRM resources associated with bus 805. A completion message is then sent form portal 808*b* to controller 806.

In an alternate embodiment, controller 806 sends a disconnect message toward listener 810*a*, which results in the message being received by portal 810*a*. Portal 810*a* forwards the message to portal 808*a* (the talker side portal of listener 804). Portal 808*a* forwards the message towards talker 802, which results in the message being received by portal 808*b*. Portal 808*b* updates the oPCR of talker 802 in order to stop transmission. Portal 808*b* accesses IRM 825 to release isochronous channel and bandwidth resources associated with bus 805. Portal 808*b* forwards the message toward listener 804, which results in the message being received by portal 808*a*. Portal 808*a* updates the iPCR of listener 804 in order to stop listener 804 from listening. Portal 808*a* updates the IRM isochronous resources associated with bus 807. Portal 808*a* then sends a completion message to controller 806.

Figure 8:
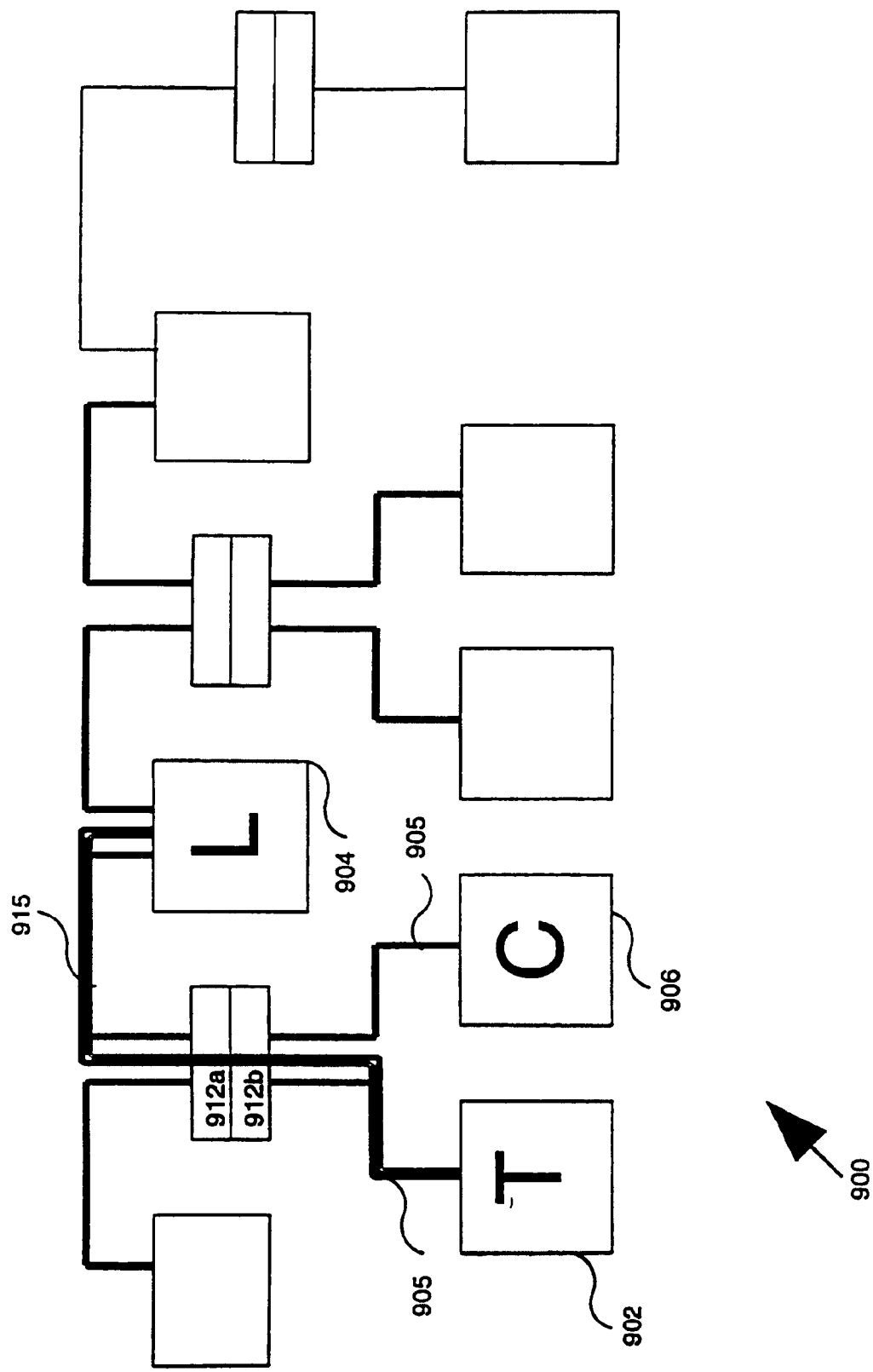
FIG. 8 is a block diagram of another embodiment for bus bridge isochronous transfer.

FIG. 8 is a block diagram of another embodiment for a bus bridge isochronous transfer. Referring to FIG. 8, a common connection isochronous transfer is illustrated. Talker 902 is connected by controller 906 to listener 904. In one embodiment, controller 906 may be on the talker bus 905, listener bus 915, or other bus. Each listener 904 is associated with a controller 906. The controller 906 may be the same or different for the various listeners 904.

In the example of FIG. 8, the connection message from controller 906 is processed by portal 912*a* in which it is found to have the same stream ID. This allows the new listener to listen to the previously established channel.

In one embodiment, a disconnect message is sent from controller 906 towards listener 904, which results in the message being received by portal 912*a*. Portal 912*a* updates the iPCR of listener 904 in order for listener 904 to stop listening. Portal 912*a* decrements its use count and returns a completion message to controller 906.

Figure 9:
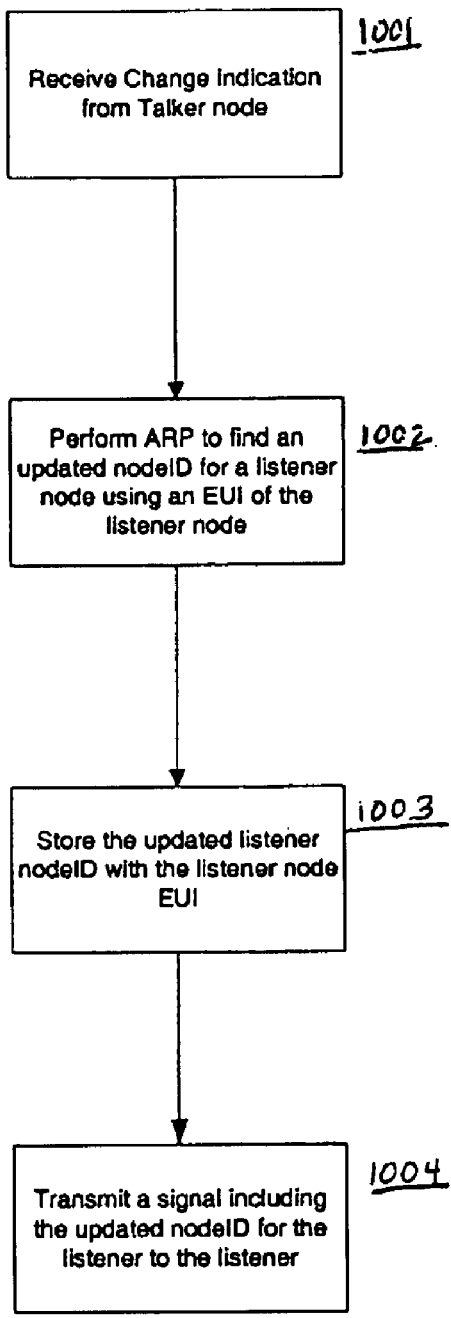
FIG. 9 is a flow diagram of one embodiment of a method of maintaining a listener's link to a controller.

FIG. 9 is a flow diagram of one embodiment of a method of maintaining listener's link to a controller. Referring to FIG. 9, at processing block 1001, a controller 806 receives a change indication from a talker node 802. The received change indication may be net change signal, indicating that something has changed. At processing block 1002, the controller 806 will perform an address resolution protocol ("ARP"). An ARP is a way of associating a nodeID with an EUI. Thus, the controller will perform an exhaustive search for a EUI matching the listener's EUI, EUI-64L. For example, the controller will search in a local bus bridge to see what buses exist. The controller 806 will then search each bus until it finds a matching EUI. Then, the controller 806 will identify the nodeID associated with the matching EUI found by the controller as a result of its exhaustive search.

At processing block 1003, the controller will then store the updated listener nodeID, nodeIDL', with the listener node EUI, EUI-64L. In one embodiment, the updated listener nodeID, nodeIDL', is stored in a bus bridge portal, such as, for example, bus bridge portal 810*b*. Each bus bridge portal has incoming and outgoing message queues so that it can process or modify or resend messages. Thus, modifications to messages sent by a talker 802 may be performed by bus bridge firmware to maintain flexibility.

At processing block 1004, the controller 806 will transmit a signal including the updated nodeID, nodeIDL', to the listener 804. Thus, the listener 804 will maintain it's link to the controller 806 even if the listeners nodeID changes since the controller 806 will update the listener's nodeID when the controller receives the signal from talker 802 that a change has occurred. Thus, if the listener's nodeID has changed and the talker transmits a signal indicating a change of the property of the connection, such as, for example, a change in the bandwidth used by the talker 802, the controller 806 will be able to forward the signal to listener 804.

It will be appreciated that all of the foregoing processing blocks are not necessary for the operation of the present invention. For example, processing block 1004 is an illustration of a signal transmitted by a talker through a maintained link between the listener 804 and controller 806.

Figure 10:
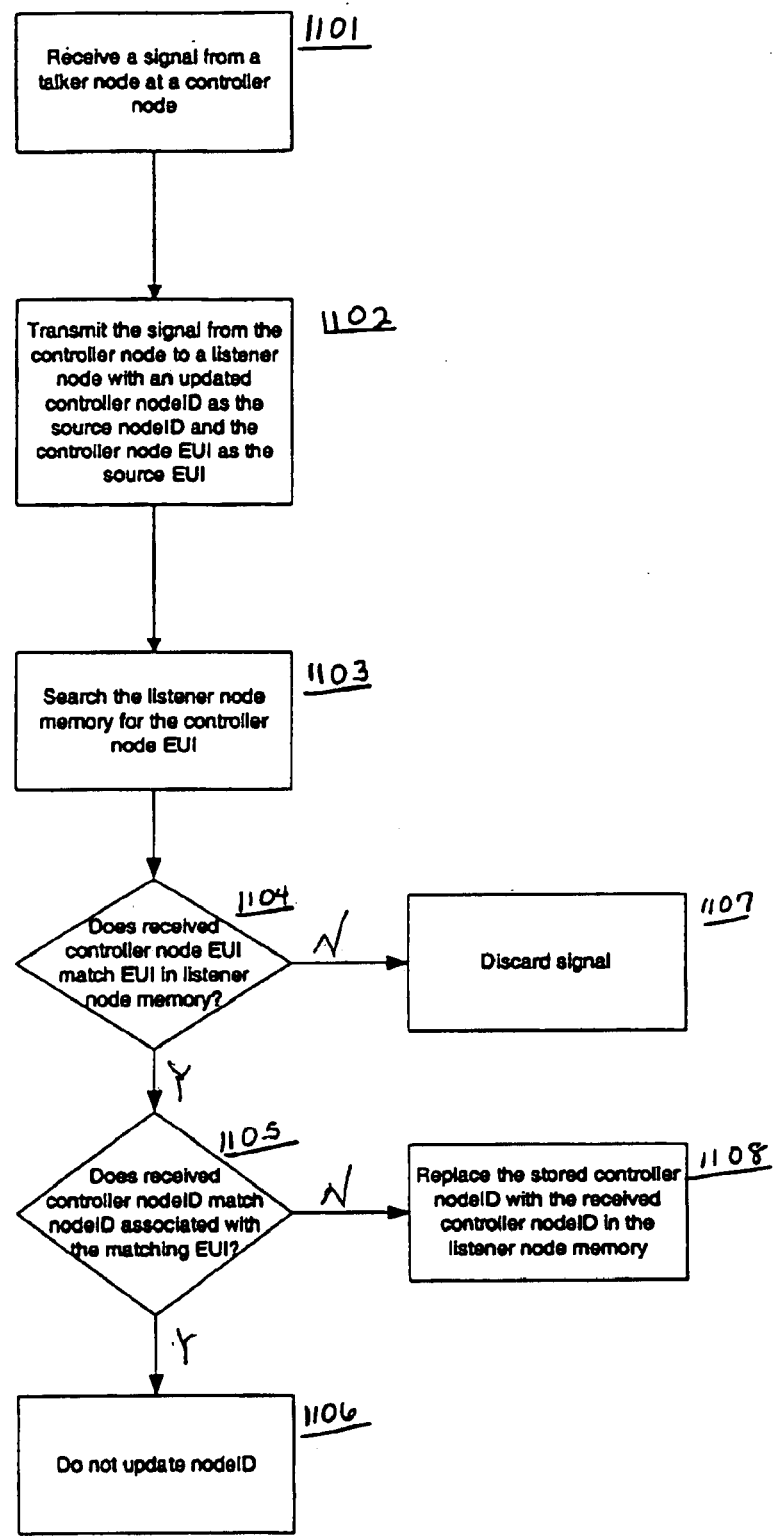
FIG. 10 is a flow diagram of another embodiment of maintaining a listener's link to a controller.

FIG. 10 is a flow diagram of another embodiment of maintaining a listeners link to a controller. Referring to FIG. 10, at processing block 1101, a signal from a talker node 802 is received at a controller node 806. The received signal from the talker node 802 may be any type of signal transmitted by the talker 802 to a listener 804.

At processing block 1102, the controller node 806 transmits the signal from the controller 806 to a listener node 804 with an updated controller nodeID, nodeIDC', as the source nodeID. The transmitted signal will also include the controller node EUI, EUI-64C, as the source EUI.

At processing block 1103, the listener node 804 will search the listener node 804 memory for the controller node 806 EUI. At processing block 1104, the listener 804 will determine if the received controller node EUI matches an EUI in the listener node memory. At processing block 1107, if the controller node EUI does not match an EUI in the listener node memory, the listener node 804 will discard the signal at processing block 1107.

At processing block 1105, if the received controller node EUI does match an EUI in the listener node memory, the listener node 804 will determine if the received controller nodeID, nodeIDC', matches the nodeID associated with the matching EUI. At processing block 1106, if the received controller nodeID does match the nodeID associated with the match EUI, the nodeID in the listener node memory will not be updated.

If the received controller nodeID does not match the nodeID associated with the matching EUI, the stored controller nodeID, nodeIDC, will be replaced in the listener node memory with the received controller nodeID, nodeIDC', at processing block 1108.

The listener node 804 may transmit a reply signal including the updated nodeID, nodeIDC', of the controller 806 and the EUI of the controller 806 as the destination address. Thus, the link between controller 806 and listener 804 is maintained even when the controllers nodeID changes.

It will be understood that the above processes may be completed in any order, and not all of the steps are necessary for the operation of the present invention. For example, the listener node 804 may search it's memory for the received controller nodeID before the listener node searches for the controller node EUI 1103, and search for a matching EUI 1104 only if the received controller nodeID does not match a controller nodeID in the listener nodes memory.

The specific arrangements and methods herein are merely illustrative of the principles of this invention. Numerous modifications in form and detail may be made by those skilled in the art without departing from the true spirit and scope of the invention.

What is claimed is:

1. A method of maintaining communications in a bus bridge interconnect comprising a plurality of buses linked by at least one bus bridge, the method comprising: receiving a change indication signal from a talker node;

performing an address resolution protocol in response to the change indication signal to find an updated node identification address("nodeID") for a listener node using a extended unique identifier ("EUI") of the listener node; and storing the updated listener nodeID with the listener node EUI.

2. The method of claim 1 further comprising:

transmitting a signal including the updated nodeID for the listener to the listener.

3. The method of claim 1 wherein performing an address resolution protocol comprises examining a bus bridge to see what buses exist, searching each bus until a matching EUI is found, and identifying the nodeID associated with the matching EUI.

4. The method of claim 1 wherein the change indication signal is a net change signal.

5. The method of claim 1 wherein the buses are similar to a version of the IEEE standard 1394 bus.

6. The method of claim 1 wherein the updated listener nodeID and listener node EUI are stored in a bus bridge portal.

7. A method of maintaining communications in a bus bridge interconnect comprising a plurality of buses linked by at least one bus bridge, the method comprising:

receiving a signal from a talker node at a controller node;

transmitting the signal from the controller node to a listener node with an updated controller nodeID as the source nodeID and the controller node EUI as the source EUI;

searching the listener node memory for the controller node EUI;

comparing, if the received controller node EUI matches a stored controller node EUI, the received controller nodeID to a stored controller nodeID associated with the stored controller node EUI; and replacing the stored controller nodeID with the received controller nodeID in the listener node memory if the received controller nodeID does not match the stored controller nodeID.

8. The method of claim 7 further comprising:

transmitting a reply signal including the updated nodeID and the EUI of the controller node.

9. The method of claim 7 further comprising:

discarding the received message if the received controller node EUI does not match a stored controller node EUI.

10. The method of claim 7 wherein the buses are similar to a version of the IEEE standard 1394 bus.

11. A method of maintaining communications in a bus bridge interconnect comprising a plurality of buses linked by at least one bus bridge, the method comprising:

receiving a signal from a talker node wherein the signal includes a node identification address ("nodeID") and an EUI of a controller node of the listener node;

searching a listener node memory for the controller node EUI;

comparing, if the received controller node EUI matches a stored controller node EUI, the received controller nodeID to a stored controller nodeID corresponding to the stored controller node EUI; and replacing the stored controller nodeID with the received controller nodeID if the received controller nodeID does not match the stored controller nodeID.

12. The method of claim 11 further comprising:

transmitting a reply signal including the updated nodeID and the EUI of the controller node.

13. The method of claim 11 further comprising:

discarding the received message if the received controller node EUI does not match a stored controller node EUI.

14. The method of claim 11 wherein the buses are similar to a version of the IEEE standard 1394 bus.

15. An apparatus comprising:
   means for receiving a change indication signal from a talker node;
   means for performing an address resolution protocol in response to the change indication signal to find an updated a node identification address("nodeID") for a listener node using a extended unique identifier ("EUI") of the listener node; and
   means for storing the updated listener nodeID with the listener node EUI.

16. An apparatus comprising:
   means for receiving a signal from a talker node at a controller node;
   means for transmitting the signal from the controller node to a listener node with an updated controller nodeID as the source nodeID and the controller node EUI as the source EUI;
   means for searching the listener node memory for the controller node EUI;
   means for comparing, if the received controller node EUI matches a stored controller node EUI, the received controller nodeID to a stored controller nodeID associated with the stored controller node EUI; and
   means for replacing the stored controller nodeID with the received controller nodeID in the listener node memory if the received controller nodeID does not match the stored controller nodeID.

17. An apparatus comprising:
   means for receiving a signal from a talker node wherein the signal includes a node identification address ("nodeID") and an EUI of a controller node of the listener node;
   means for searching a listener node memory for the controller node EUI;
   means for comparing, if the received controller node EUI matches a stored controller node EUI, the received controller nodeID to a stored controller nodeID corresponding to the stored controller node EUI; and
   means for replacing the stored controller nodeID with the received controller nodeID if the received controller nodeID does not match the stored controller nodeID.

18. A machine-readable medium having stored thereon instructions, which when executed by a set of processors, cause said set of processors to perform the following:
   receive a change indication signal from a talker node;
   perform an address resolution protocol in response to the change indication signal to find an updated a node identification address("nodeID") for a listener node using a extended unique identifier ("EUI") of the listener node; and
   store the updated listener nodeID with the listener node EUI.

19. A machine-readable medium having stored thereon instructions, which when executed by a set of processors, cause said set of processors to perform the following:
   receive a signal from a talker node at a controller node;
   transmit the signal from the controller node to a listener node with an updated controller nodeID as the source nodeID and the controller node EUI as the source EUI;
   search the listener node memory for the controller node EUI;
   compare, if the received controller node EUI matches a stored controller node EUI, the received controller nodeID to a stored controller nodeID associated with the stored controller node EUI; and
   replace the stored controller nodeID with the received controller nodeID in the listener node memory if the received controller nodeID does not match the stored controller nodeID.

20. A machine-readable medium having stored thereon instructions, which when executed by a set of processors, cause said set of processors to perform the following:
   receive a signal from a talker node wherein the signal includes a node identification address ("nodeID") and an EUI of a controller node of the listener node;
   search a listener node memory for the controller node EUI;
   compare, if the received controller node EUI matches a stored controller node EUI, the received controller nodeID to a stored controller nodeID corresponding to the stored controller node EUI; and
   replace the stored controller nodeID with the received controller nodeID if the received controller nodeID does not match the stored controller nodeID.

* * * * *